(12) United States Patent
Kuehnel et al.

(10) Patent No.: US 8,446,320 B2
(45) Date of Patent: May 21, 2013

(54) RELIABLE LOCATION INFORMATION FOR A MOBILE STATION USING A NON-GPS LOCATION TECHNIQUE

(75) Inventors: Thomas Werner Kuehnel, Seattle, WA (US); Mark Lino Nielsen, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 12/871,012

(22) Filed: Aug. 30, 2010

(65) Prior Publication Data

US 2012/0050098 A1 Mar. 1, 2012

(51) Int. Cl.
*G01S 3/02* (2006.01)
*G01S 19/12* (2010.01)

(52) U.S. Cl.
USPC ........................... 342/464; 342/357.49

(58) Field of Classification Search
USPC ............... 342/357.23, 357.31, 357.4, 357.49, 342/357.71, 464, 451, 463
See application file for complete search history.

(56) References Cited

U.S. PATENT DOCUMENTS

| | | | |
|---|---|---|---|
| 6,252,543 B1 | 6/2001 | Camp | |
| 6,826,762 B2 | 11/2004 | Shell et al. | |
| 6,850,734 B1 | 2/2005 | Bruno et al. | |
| 7,064,708 B2 | 6/2006 | Akopian et al. | |
| 7,403,762 B2 | 7/2008 | Morgan et al. | |
| 2002/0098851 A1 | 7/2002 | Walczak et al. | |
| 2006/0225082 A1 | 10/2006 | Yao et al. | |
| 2007/0082652 A1 | 4/2007 | Hartigan et al. | |
| 2007/0232324 A1 | 10/2007 | Kim et al. | |
| 2008/0045138 A1 | 2/2008 | Milic-Frayling et al. | |
| 2008/0248813 A1 | 10/2008 | Chatterjee | |
| 2008/0253312 A1 | 10/2008 | Park | |
| 2009/0009397 A1 | 1/2009 | Taylor et al. | |
| 2009/0121927 A1* | 5/2009 | Moshfeghi | 342/357.03 |
| 2009/0160711 A1 | 6/2009 | Mehta | |
| 2009/0197640 A1 | 8/2009 | Fa et al. | |
| 2009/0201879 A1 | 8/2009 | Purkayastha et al. | |
| 2009/0227270 A1* | 9/2009 | Naaman | 455/456.6 |
| 2010/0056185 A1 | 3/2010 | Lamba | |
| 2012/0007775 A1* | 1/2012 | Alizadeh-Shabdiz | 342/357.31 |

OTHER PUBLICATIONS

Lamarca, et al., "Place Lab: Device Positioning Using Radio Beacons in the Wild", Retrieved at <<http://www.placelab.org/publications/pubs/pervasive-placelab-2005-final.pdf>> In Proceedings of the Third International Conference on Pervasive Computing, Published Date: Mar. 14, 2005, pp. 116-133.

(Continued)

*Primary Examiner* — Cassie Galt
(74) *Attorney, Agent, or Firm* — Mayer & Williams PC

(57) ABSTRACT

A method and apparatus determines if a location fix received by a mobile station using a non-GPS location techniques is accurate. Location results obtained using the non-GPS location technique or techniques are treated as accurate if they are verified as being within an error margin obtained from a trusted source of location information such as a GPS positioning system. Non-GPS Location information may be obtained from a signal transmitted by the base station, which signal includes the base station location. The non-GPS location information may also be obtained from a backend service associated with the wireless network that includes the base station.

7 Claims, 8 Drawing Sheets

OTHER PUBLICATIONS

Lorincz, et al., "A Robust, Decentralized Approach to RF Based Location Tracking", Retrieved at <<ftp://ftp.deas.harvard.edu/techreports/tr-19-04.ps.gz>> Published Date: 2004, vol .11, No. 6, pp. 13.

International Search Report, Mailed Date: Mar. 6, 2012, Application No. PCT/US2011/045733, Filed Date: Jul. 28, 2011, pp. 8. (MS# 329889.02).

* cited by examiner

RELIABLE LOCATION INFORMATION FOR A MOBILE STATION USING A NON-GPS LOCATION TECHNIQUE

BACKGROUND

Mobile phones and other types of mobile communication stations include sophisticated hardware and software designed to enhance the user experience. One of the more recent features to be incorporated into mobile phones is positioning technology. Mobile positioning technology such as the Global Positioning System (GPS), and non-GPS location techniques, which require knowledge of the location of the base station tower or antenna that the phone is currently using to establish communication, allow a user to determine his or her current location. Applications residing on the mobile phone may offer various location-based services that use such positioning information.

One problem that arises when non-GPS location techniques are employed is that they are not always accurate or up to date. Moreover, their accuracy is generally inferior to the accuracy that is available with GPS location techniques.

SUMMARY

In one implementation, a method and apparatus is provided for determining if a location fix received by a mobile station using a non-GPS location techniques is accurate. Location results obtained using the non-GPS location technique or techniques are treated as accurate if they are verified as being within an error margin obtained from a trusted source of location information such as a GPS positioning system. Non-GPS Location information may be obtained from a signal transmitted by the base station, which signal includes the antenna location of the corresponding base station. The non-GPS location information may also be obtained from a backend service associated with the wireless network that includes the base station antenna location.

In another implementation, the error margin associated with the non-GPS location technique can be gradually reduced by establishing thresholds obtained using the GPS location technique. For instance, if the location fix corresponds to the location of the base station antenna from which the mobile station receives the location fix, the error margin will generally correspond to the maximum possible range or coverage area of the base station. Sometime this is referred to as the effective antenna range. This error margin can be reduced by determining the actual range of the base station from GPS location fixes obtained over time for a large number of mobile stations that move within the actual coverage area of the base station. Since in practice the actual coverage area of the base station will generally be less than its maximum possible coverage area (as determined by the particular technology that is employed), the error margin can be reduced by a commensurate amount.

DETAILED DESCRIPTION

Figure 1:
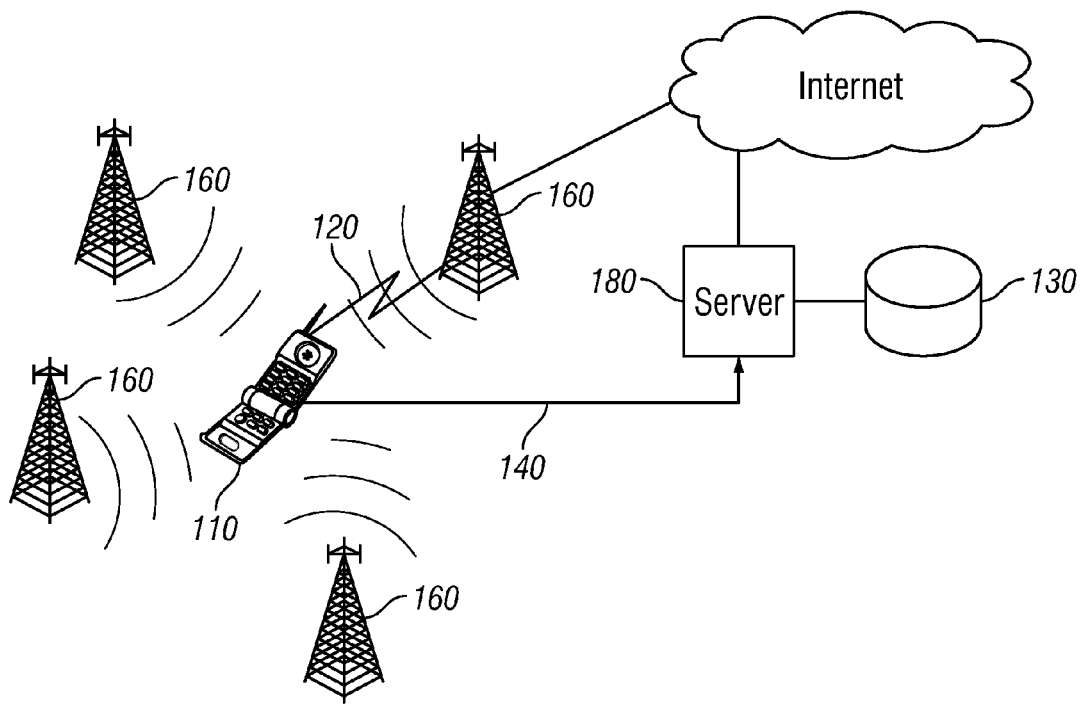
FIG. 1 shows one example of a wireless communications system in which a mobile station (MS) can establish communication with a series of base stations.

FIG. 1 shows a simplified schematic diagram of a wireless communication network that can provide location or positional information to wireless mobile stations. Examples of such wireless communication networks include wireless wide area networks (WWAN), wireless local area networks (WLAN), wireless personal area networks (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2), 3GPP and 3GPP2 documents are publicly available. A WLAN may comprise an IEEE 802.11x network, and a WPAN may comprise a Bluetooth network, an IEEE 802.15x, for example. The methods and techniques shown herein may also be used for any combination of WWAN, WLAN and/or WPAN.

The mobile station (MS) 110 shown in FIG. 1 may be any entity that can communicate with the wireless communication network, which may be operated by a wireless service provider, for example. Such an MS may comprise a cellular telephone, a personal digital assistant (PDA), or a notebook computer, just to name a few examples. The MS 110 may communicate with any number of base stations such as cellular base stations 160 shown in FIG. 1. Each base station may provide communication for a respective coverage area or cell. The term "cell" may refer to a base station and/or its coverage area. To increase system capacity, a coverage area of a base station may be partitioned into sectors. The term "base station" as used herein may refer to a base station that serves a cell and/or a base station that serves a sector. The term "base station" is also used generically to refer to a similar device in other types of wireless networks. For instance, in the context of an IEEE 802.11x network, the base station corresponds to a wireless access point.

The MS 110 may be enabled to receive a beacon or pilot signal 120 from cellular base station 160. Such a pilot signal is well-known in the art, and may be dictated by IS-95A, IS 2000, and J-STD-008 standards, for example. Cellular base station 160 may comprise a code division multiple access (CDMA) radio access network (RAN). A pilot signal, which may be carrier modulated by a pseudonoise (PN) sequence, may be used for time synchronization, handoff among cellular base stations, and provision of a coherent reference, to name a few examples. A broadcast, pilot signal, or beacon, which are used interchangeably herein, may include a system parameters message (SPM).

Such an SPM may include information regarding a cellular base station, such as cellular base station 160 shown in FIG. 1. For example, the SPM may include a base station ID (BSID) that may uniquely identify a cellular base station and its antenna. The SPM may also include a location fix specifying the location of the base station, specifically the location of the base station antenna. A location fix may provide geographic information, such as latitude and longitude, a geographical map, and/or any information that may convey a location and/or position of a base station antenna. A location fix may include relative location information, wherein a location is provided in terms relative to another location, such as a location of a landmark, a region, a marketplace, a cellular tower, an airport, a second mobile station, and a previous location fix, just to name a few examples.

The MS 110 may include an application that extracts the BSID and the location fix from the pilot signal it receives from a particular cellular base station. Since the pilot or beacon signal may provide a location of the cellular base station antenna with which the MS is communicating, a location of the MS may be determined as being within the "cell" of the cellular base station. That is, the location of the MS may be known to be somewhere within the coverage area of the cell base station, which may be referred to as the error margin. The accuracy of this method of determining the approximate MS position may depend in part on the cell size, or coverage area, which may range between two kilometers and thirty five kilometers in radius, for example. Accordingly, at least within a limited uncertainty defined by the error margin, an MS, which lacks a GPS positioning ability, may nevertheless determine its position using a pilot or beacon signal. If an MS changes location so that it begins to use a different cellular base station, then the received pilot or beacon signal, including the SPM, may change accordingly. The new SPM may include a new BSID and location fix. In this way the MS may determine its location as being within the cell of the new cellular base station antenna.

The mobile station may also obtain its geographical location from a backend server 180 and its associated database 130, which may be maintained, for example, by the wireless service provider operating the wireless network. The backend database may associate the BSID of the base stations with their respective geographical locations. Accordingly, the MS may determine a location fix by extracting the BSID from the pilot or beacon signal and transmitting such extracted information to the backend server 180. The server 180 may access a look-up table or the like in database 130 to find a corresponding location of the base station. The server 180 may then transmit the base station location back to the MS. Again, the determined position may be that of the base station, but the MS may be assumed to be relatively nearby, at least within the base station's "cell".

The MS 110 may communicate with the backend database over the wireless path 140 shown in FIG. 1. The base station 150 may also communicate with the backend server 180 over a wired and/or wireless path via a communication network such as the Internet 170, for example.

In some cases the location information that the MS obtains from the base station's pilot or beacon signal and/or from the backend database 130 may not always be accurate or up to date. In this case the position information extracted by the MS will be erroneous. However, mobile stations are more and more commonly being equipped with global positioning transceivers that can detect the location of the device to within a high accuracy using a GPS satellite navigation system. In general a GPS system can pinpoint the location of the mobile device with a greater accuracy than can otherwise be obtained from the wireless communication network itself. Accordingly, the GPS location information can be treated as the definitive or most trusted source of location information and thus it can be used to validate, correct and update as necessary the location information available from the wireless communication system's backend server 180.

Figure 2:
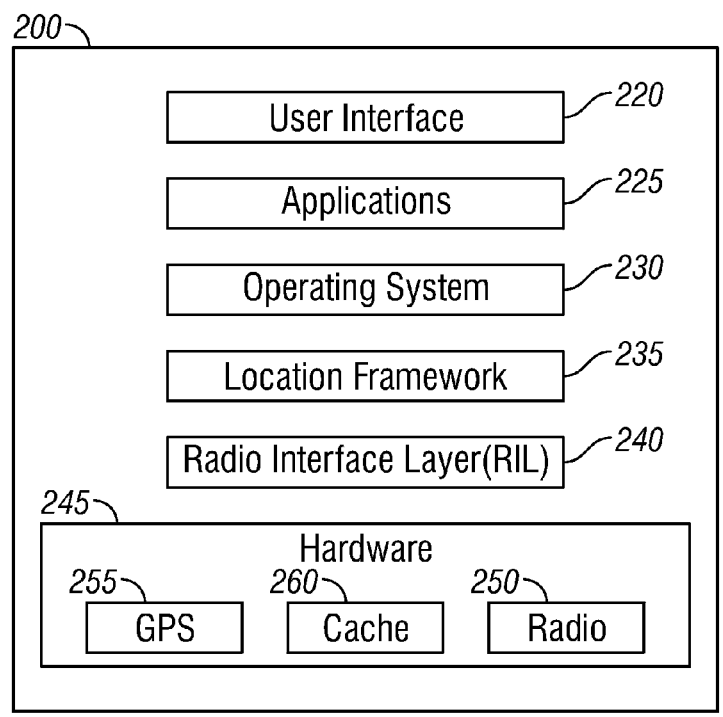
FIG. 2 shows one particular illustrative architecture of the major functional components of mobile communications device.

FIG. 2 shows one particular illustrative architecture 200 of the major functional components of a mobile communications device which can be used to facilitate the present arrangement. Although the architecture 200 shown in FIG. 2 is particularly adapted for a mobile phone, the fundamental principles it illustrates can be expected to have general applicability to other platforms such as, for example, a PC, netbook or the like. In this exemplary embodiment, a UI 220 is provided by the architecture 200 to support user interactivity and facilitate an effective user experience, and will typically be embodied as a graphical user interface. A variety of applications reside on the MS, which applications are collectively indicated by reference number 225. Some applications that reside on the MS may offer location-based services which require the MS to determine its location. Such location-based services may integrate a mobile device's location or position with other information so as to provide added value to a user. Examples of such applications include map applications, traffic alert applications, geo-tagging applications (to e.g., tag a recorded image with its location) and other applications that identify for the user nearby points-of-interest (e.g. restaurants, stores).

Supporting the applications 225 in the architecture 200 are an operating system 230, a location framework layer 235, a radio interface (RIL) layer 240 and a hardware layer 235. In this exemplary embodiment, the operating system 230 is particularly adapted to operate on a resource-limited device and may comprise, for example, Android. The location framework layer 235 provides logic and control functions that capture the location information obtained from the hardware layer 245 and makes it available to any of the applications 225 that require it. The RIL layer 240 is a set of APIs providing a level of abstraction between the radio on a mobile phone and the software of the mobile phone. That is, the RIL layer 240 serves as a hardware adaptation layer, i.e., a layer that isolates the specifics of a particular mobile system/hardware from the bulk of the software system. In this way various software solutions may be adaptable to multiple different mobile systems and radios.

The hardware layer 235 provides an abstraction of the physical hardware implemented on the ms and will typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. The aforementioned physical hardware components are not illustrated in layer 235 since they are not pertinent to the present discussion. However, the following hardware components are depicted in FIG. 2 since they are pertinent to the discussion that follows.

In particular, the hardware layer 235 of the MS includes a wireless radio 250, GPS receiver 255 and a cache 260. The wireless radio 250 allows the MS to communicate with the wireless network. The radio 250 includes such conventional components as a transmitter, receiver, antenna and so on. The GPS positioning circuit 255 receives signals through a GPS antenna from a GPS satellite navigation system for determining the location of the MS. Among other things, the cache 260 may be used to store cellular base station IDs (BSIDs) and their corresponding location information pertaining to various cellular base stations that the ms has been in communication with. Thus, the cache 260 may include a subset of the information located in the backend database 130 shown in FIG. 1. In this way the MS does not need to exchange messages with the backend database 130 each and every time it wants to obtain location information regarding a base station.

Two methods are commonly used to receive GPS signals from GPS satellites. One method, generally used in conventional terminals, is a stand-alone GPS that calculates GPS satellite orbits and pseudo distances to the satellites using a GPS chipset or module mounted on a terminal circuit and determines the location of the object terminal without any information exchange with an external assistance server. The other is an assisted GPS ("AGPS") method that has recently become popular as an attractive option for providing accurate location. AGPS uses a mobile network to reduce the initialization time that a normal GPS receiver needs to receive navigation data. In AGPS, information about satellite orbits and errors previously measured by a base station is provided to the ms through a communication means. The GPS chipset or module mounted in the terminal determines the location of the terminal in a short time using the data received from the base station and the calculated pseudo distance from the GPS satellites.

Figure 3:
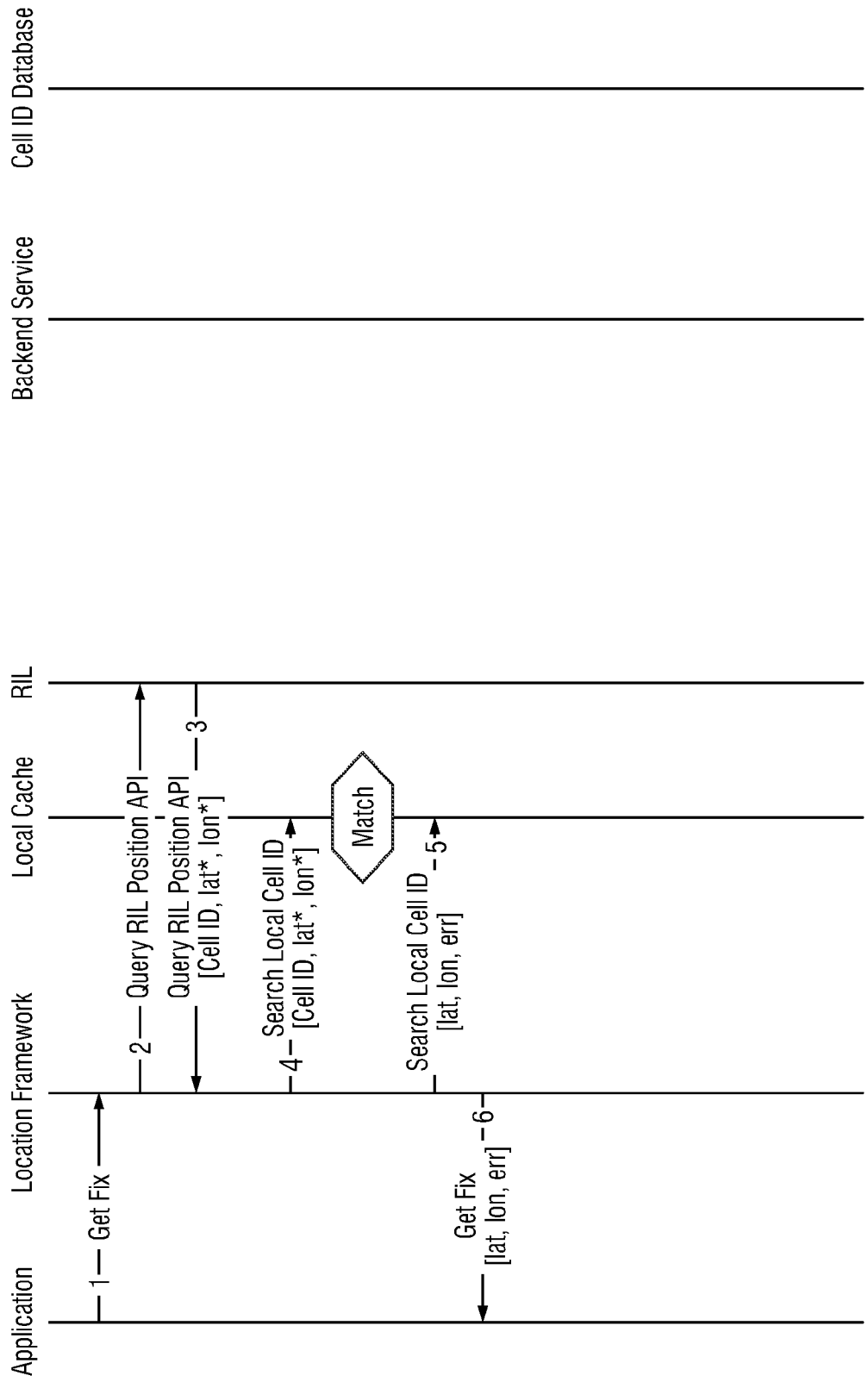
FIG. 3 is a message flow diagram illustrating a method by which the MS can determine its approximate location from the base station's broadcast signal (often referred to as a beacon) while also confirming the base station antenna location information stored in its local cache.

FIG. 3 is a message flow diagram illustrating a method by which the MS can determine its approximate location from the base station's pilot signal while also confirming the base station location information stored in its local cache. As indicated at message 1, an application 225 residing on the MS requests the current location or fix of the MS. The application may be any location-based service application such as those examples discussed above by way of illustration. The request is sent to the location framework layer 235 in the MS. In response, the location framework layer 235 sends a message (message 2) to the RIL layer 240, which in turn instructs the radio 250 to request location information from the local base station through which the MS is currently communicating with the wireless network. In particular, the radio 250 obtains the ID of the base station (e.g., the cell ID in the case of a cellular network and a MAC address in the case of an IEEE 802.11x network) and its location such as its latitude and longitude from the pilot signal. Upon receiving the location information, the RIL layer 240 forwards it on to the location framework layer 235 (message 3). The location framework layer 235 generates a request (message 4) to search the MS's local cache 260 to determine if it contains location information associated with the base station ID received from the local base station. If this information is available, it is compared to the location information obtained from the pilot signal. If the location information obtained from both sources match, confirmation is sent to the location framework layer 235 (message 5), which in turn provides the information to the application 225 (message 6).

Figure 4:
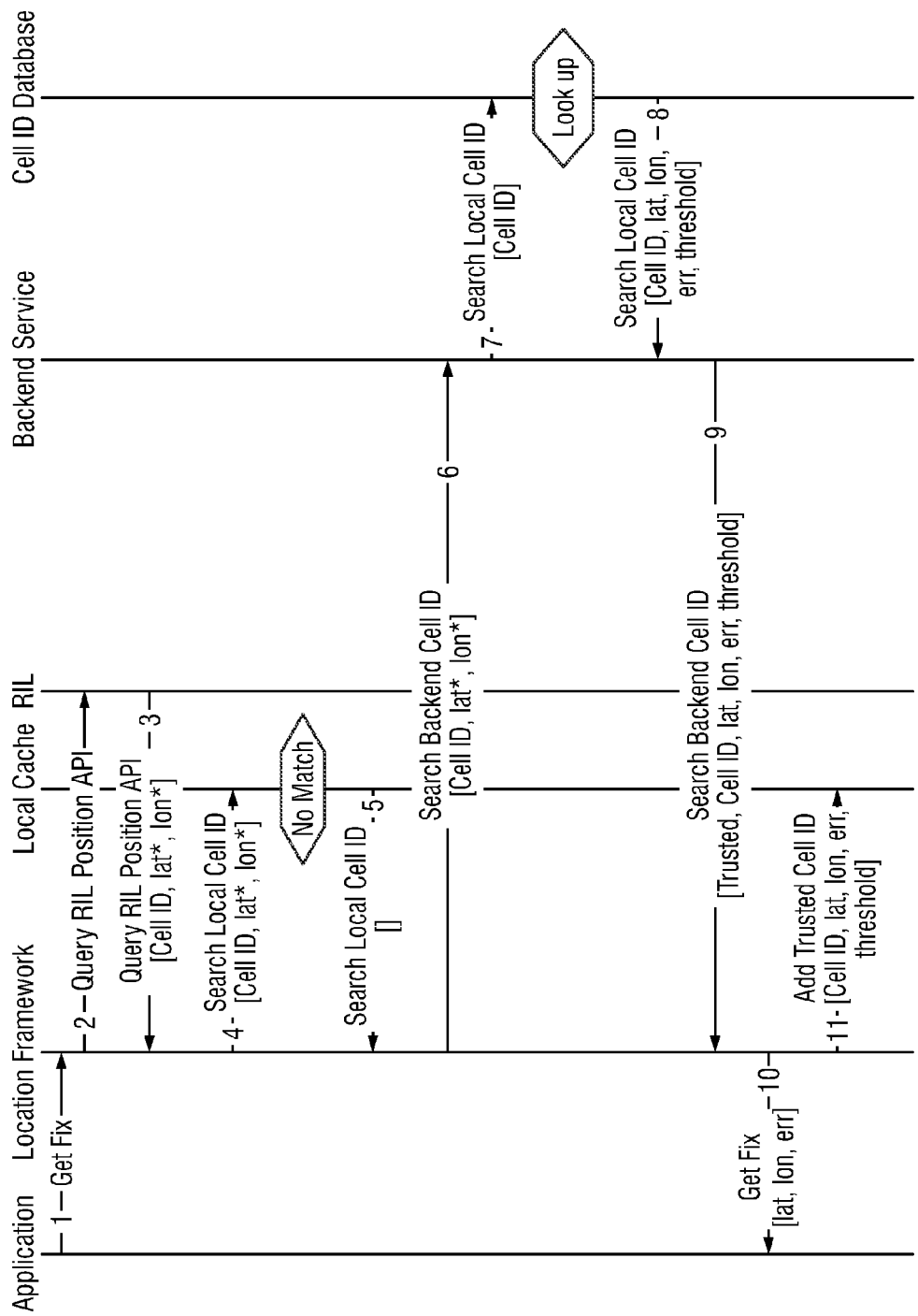
FIG. 4 is a message flow diagram illustrating a method by which the MS can determine its approximate location when the information obtained from the base station's broadcast signal does not match the base station location information in its local cache because the local cache is empty.

FIG. 4 is a message flow diagram illustrating a method by which the MS can determine its approximate location when the information obtained from the base station's pilot signal does not match the base station location information in its local cache because the local cache is empty. Messages 1-4 are the same as those discussed above in connection with FIG. 3. In this case, however, the local cache notifies the location framework layer 235 (message 5) that is does not have any location information associated with this particular base station ID. In response, the location framework layer 235 establishes communication with the backend server 180 (message 6) and requests it to search its database 130 (message 7) to obtain any available location information associated with that base station ID. The database 130 sends the location information to the backend server 180 (message 8), which in turn forwards it to the location framework layer 235 in the MS (message 9). The location framework layer 235 then sends the location information to the application (message 10) and the local cache (message 11), where it will be available for future reference.

Figure 5:
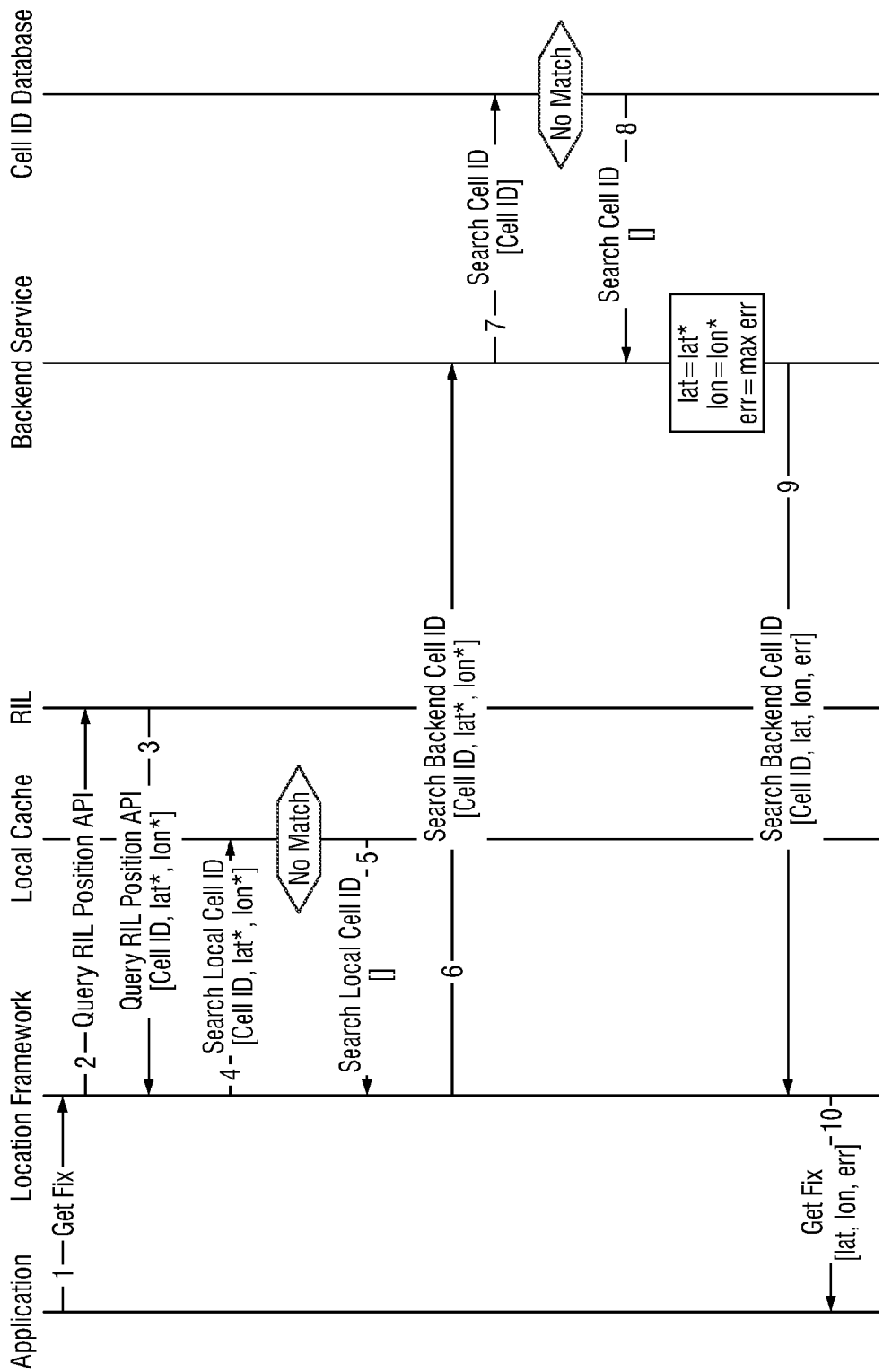
FIG. 5 is a message flow diagram illustrating a method by which the MS can determine its approximate location when it is not available from either its local cache or the backend database.

FIG. 5 is a message flow diagram illustrating a method by which the MS can determine its approximate location when it is not available from either its local cache or the backend database 130. Messages 1-7 are the same as those discussed above in connection with FIG. 4. In this case, however, the database 130 notifies the backend server 180 that the location information for the base station is not available (message 8). Accordingly, the backend server 180 uses the location information available to the base station (and which was communicated to the location framework layer 235 in message 3) and forwards it on the location framework layer 235 (message 9). Finally, the location framework layer 235 forwards the base station location information to the application 225 (message 10).

Figure 6:
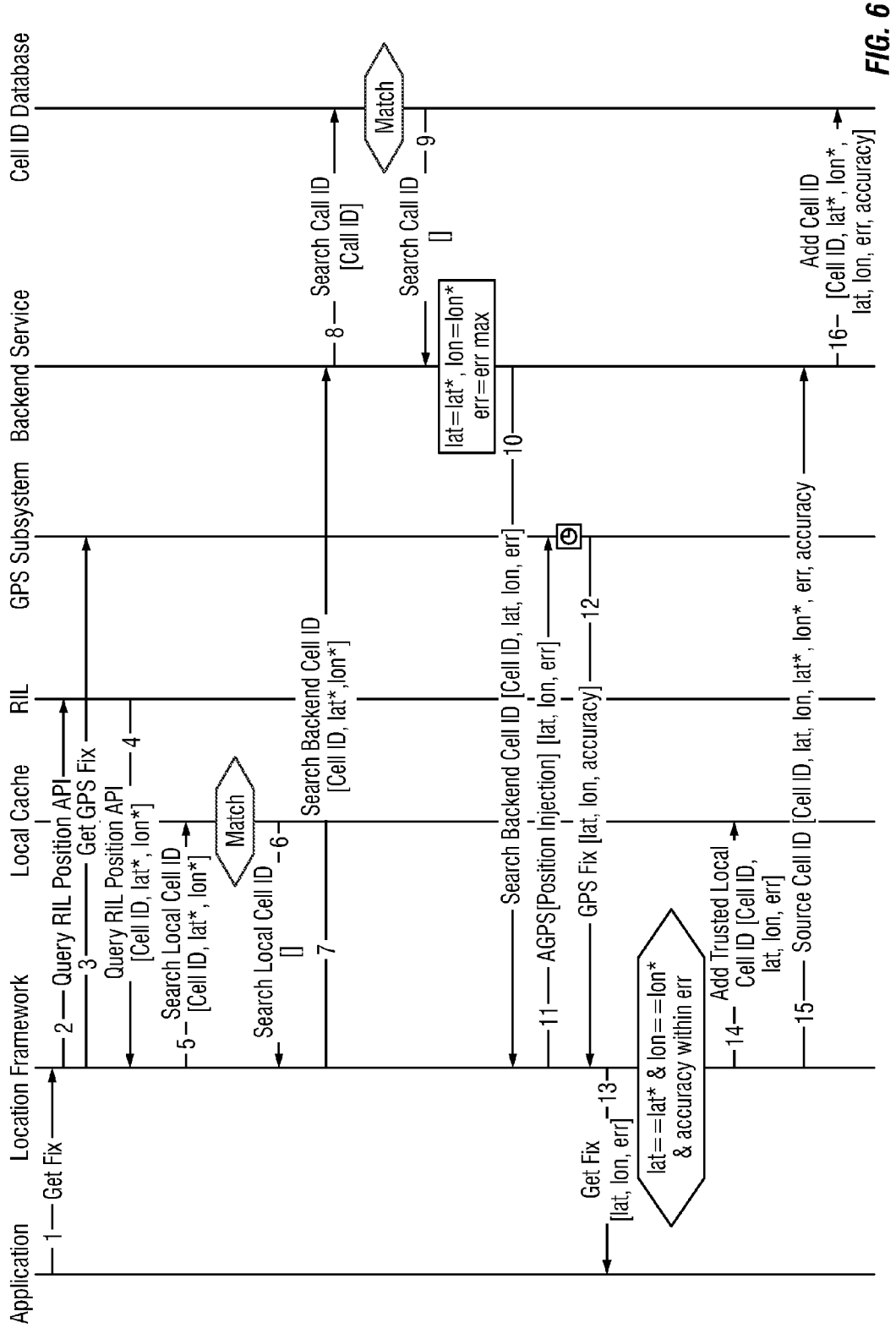
FIG. 6 is a message flow diagram illustrating another method by which the MS can determine its approximate location when this information is not available from its local cache or the backend database.

FIG. 6 is a message flow diagram illustrating another method by which the MS can determine its approximate location when this information is not available from its local cache or the backend database 130. In this case, however, location information is only available from the base station pilot signal and the GPS navigation system. As indicated at message 1, an application 225 residing on the MS requests the current location or fix of the MS. The request is sent to the location framework layer 235 in the MS. In response, the location framework layer 235 sends a message (message 2) to the RIL layer 240, which in turn instructs the radio 250 to request location information from the local base station through which the MS is currently communicating with the wireless network. The location framework layer 235 also requests the GPS circuit 255 to obtain the location of the MS (message 3). In response to the request to the RIL layer 240, the radio 250 obtains the ID of the base station (e.g., the cell ID in the case of a cellular network and a MAC address in the case of an IEEE 802.11x network) and its location such as its latitude and longitude from the pilot signal. Upon receiving the location information, the RIL layer 240 forwards it on to the location framework layer 235 (message 4). The location framework layer 235 generates a request (message 5) to search the MS's local cache 260 to determine if it contains location information associated with the base station ID received from the local base station. The local cache notifies the location framework layer 235 (message 6) that is does not have any location information associated with this particular base station ID, like a cell ID or MAC address. In response, the location framework layer 235 establishes communication with the backend server 180 (message 7) and requests it to search its database 130 (message 8) to obtain any available location information associated with that base station ID. The database 130 notifies the backend server 180 that the location information for the base station is not available (message 9). Accordingly, the backend server 180 uses the location information available to the base station (and which was communicated to the location framework layer 235 in message 4) and forwards it on the location framework layer 235 (message 10). The location framework layer 235, in turn, forwards the location information to the GPS receiver 255 (message 11) as part of the AGPS process. The GPS receiver 255 obtains the location information from the GPS satellite navigation system (which has a higher degree of accuracy than the location information obtained from the base station) and forwards it to the location framework layer 235 (message 12). The location framework layer 235, turn, forwards the GPS location information to the application (message 13). The location framework layer 235 also forwards the GPS location information to the locale cache 260 so that it is available for future reference (message 14) as well as to the backend server 180 (message 15), which in turn forwards it to the database 130 (message 16).

Figure 7:
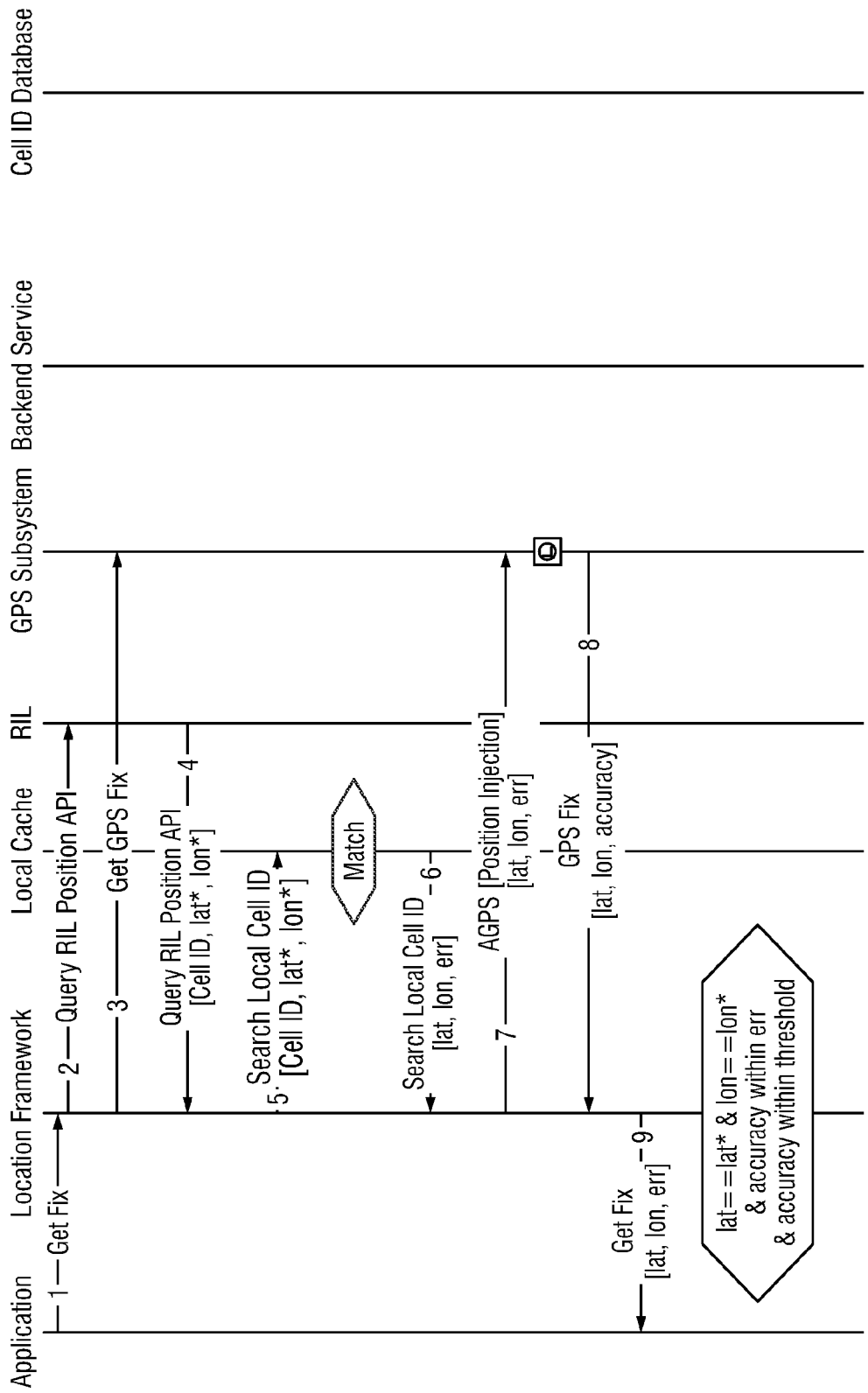
FIG. 7 shows a message flow diagram in which location information is available from both the local cache and the GPS system.

FIG. 7 shows a message flow diagram in which location information is available from both the local cache 260 and the GPS 255. Messages 1-5 are same as those discussed in connection with FIG. 6. In this case, however, the local cache 260 does contain location information for the local base station with which the MS is communicating which is provided to the location framework layer 235 (message 6). This information matches the location information obtained from the pilot signal provided by the base station. The location framework layer 235 next forwards the location information to the GPS receiver 255 (message 7) as part of the AGPS process. The GPS receiver 255 obtains the location information from the GPS satellite navigation system (which is presumed to have a higher degree of accuracy than the location information obtained from the base station) and forwards it to the location framework layer 235 (message 8). The location framework layer 235, in turn, forwards the GPS location information and the accuracy associated therewith to the application (message 9). In this example the error or uncertainty in the location information reported by the local cache is greater than the accuracy reported by the GPS system (e.g., the error reported by the local cache may be 400m and the error reported by the GPS system may be 300m. Since the more trusted source of location information (the GPS system) has the greater accuracy as expected, no further action needs to be taken.

Figure 8:
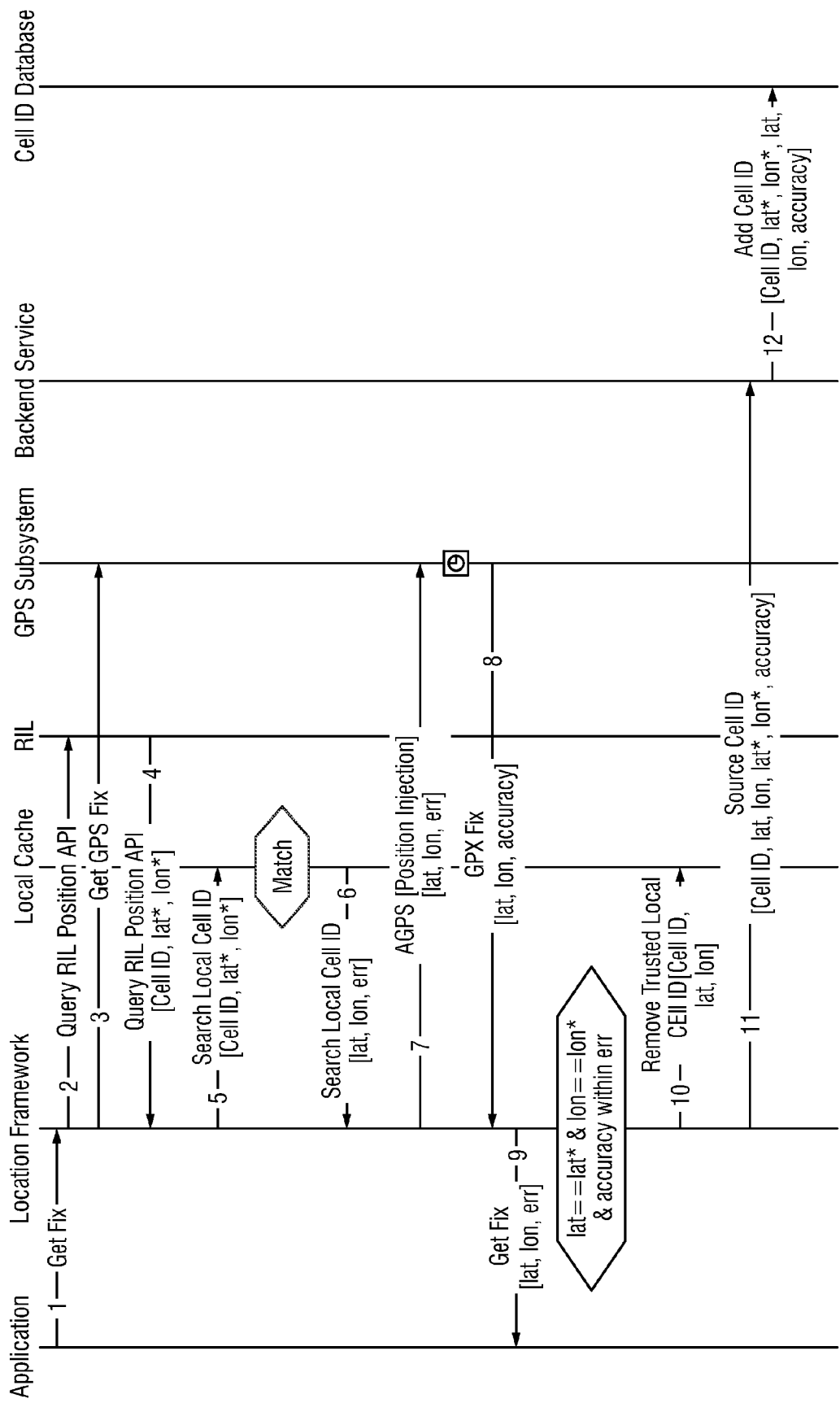
FIG. 8 shows another message flow diagram in which location information is available from both the local cache and the GPs.

FIG. 8 shows another message flow diagram in which location information is available from both the local cache 260 and the GPS 255. Messages 1-9 are same as those discussed in connection with FIG. 7. In this case, however, the error reported by the local cache 260 is less than the accuracy reported by the GPS system, which indicates that data in the local cache 260 may be in error. Accordingly, the location framework layer 235 instructs the local cache 260 to replace its current location information with the GPS location information (message 10). The location framework layer 235 also instructs the backend server to update its backend database with the GPS information (message 11), which it subsequently does (message 12).

In addition to using the GPS system to update the location information available in the backend database 130 and/or the local cache 260, the GPS system may be used to reduce the location information error margin provide by the backend server and/or the pilot signal. As previously mentioned, the error margin associated with the location information is initially assumed to be equal to the maximum coverage area of the base station. This error margin may be reduced with the aid of the location information collectively provided by the many GPS-equipped mobile stations which over time establish communication with an individual base station. This process can be described with reference to FIG. 9.

Figure 9:
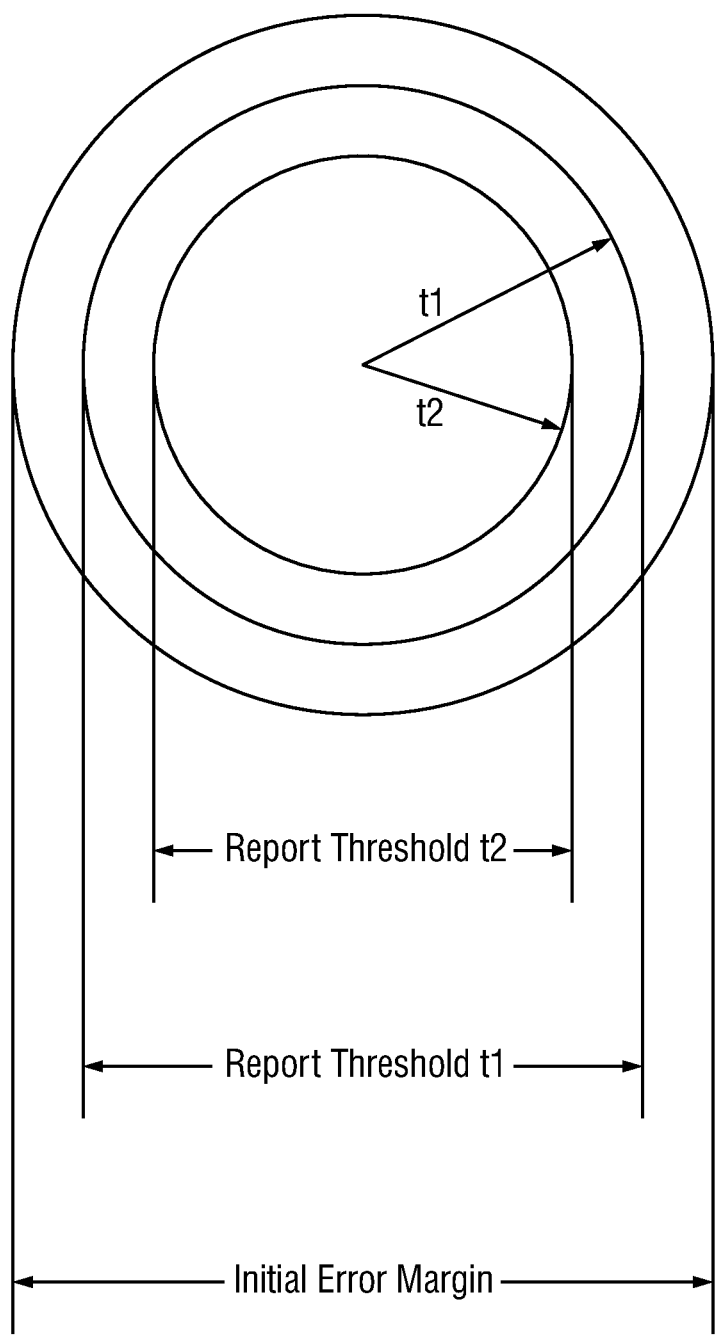
FIG. 9 shows a series of concentric circles that represent the area of coverage of a base station located at their center.

FIG. 9 shows the coverage area of a base station located at the center of the concentric circles. The radius of the outermost circle represents the initial error margin. That is, when an MS in communication with the base station receives location information from the base station's pilot signal or its backend server, its actual location is only known to be within an area defined by the diameter of the outer circle. As various mobile stations establish communication with this base station, they will report their respective GPS location information to the backend server associated with this base station when, for instance, as in FIG. 8, the error reported by the backend server is less than the accuracy reported by the GPS system, which indicates that there is an error in the data. Over time the backend server may find that it does not receive any GPS location information from an area defined by a smaller circle than that defined by the error margin. In FIG. 9 this smaller circle has a diameter that is denoted as threshold t1.

Once the backend server receives GPS location information from a statistically significant number of mobile stations and determines that it has not received any GPS location information from mobile stations located a distance greater than t1 from the base station, it can conclude that the actual coverage area of this base station is in practice no greater than the area defined by the circle having a diameter t1. Accordingly, the backend server may over time (e.g. weeks) reduce the error margin to t1. Over an additional period of time, the backend server may reduce the error margin even further, to t2, if it does not obtain GPS location information mobile stations located within a area defined by the radius t2.

As an example, in FIG. 8 it was assumed that the location error margin reported by the local cache 260 was less than the location accuracy reported by the GPS system, thereby erroneously suggesting that the location information obtained from the backend server (or the base station's pilot signal) is more accurate than the location information obtained from the GPS system. As a result, the GPS location information was provided to the backend server. If over time, however, the backend server does not receive any GPS location information from mobile stations located between the error margin and t1, the error margin may eventually be reduced (in a graduated or step-wise manner) to the area defined by the radius t1. Likewise, if over yet more time the backend server does not receive any GPS location information from mobile stations located between t2 and t1, the error margin may be reduced to t2.

In order to reduce the number of messages that need to be received from mobile stations in order to reduce the error margin, in some implementations the mobile stations will not report GPS location information to the backend server if the GPS location information specifies a location that is within the current threshold (e.g., t1 or t2). In this way the backend server will only receive location information indicating that the current threshold may be in error and should be increased.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method by which a mobile station confirms its location, comprising:
    obtaining a first location fix of a mobile station from a beacon received from a base station;
    forwarding the first location fix to a backend server associated with the base station;
    receiving a second location fix from the backend server;
    comparing the first location fix obtained from the beacon to the second location fix obtained from the backend server associated with the base station; and
    validating the first location fix if it matches the second location fix within an initial error margin having a maximum value defined by a maximum coverage area of the base station,
        wherein the error margin is reduced to a value derived from a trusted source of location information, when the value derived from the trusted source of location is less than the maximum value defined by the coverage area of the base station.

2. The method of claim 1 wherein, if the first location fix is verified, further comprising communicating the first location fix to an application requesting a location fix of the mobile station, said application being associated with the mobile station.

3. The method of claim 2 wherein the application resides on the mobile station.

4. The method of claim 2 wherein the application implements a location-based service.

5. The method of claim 1 wherein the trusted source is a GPS system that determines the error margin for the base station from a plurality of mobile stations that detect a signal from the base station.

6. The method of claim 1 wherein obtaining the first location fix includes retrieving the first location fix from a local cache in the mobile station where the first location fix was previously stored in association with a base station identifier obtained from the beacon.

7. The method of claim 1 further comprising storing the first location fix in a local cache of the mobile station after it has been verified.

* * * * *